United States Patent
Wan

(10) Patent No.: US 6,819,879 B1
(45) Date of Patent: Nov. 16, 2004

(54) METHOD AND APPARATUS FOR ENCODING OPTICAL POWER AND NON-PAYLOAD DATA IN AN OPTICAL SIGNAL

(75) Inventor: Ping Wai Wan, Kanata (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/473,714

(22) Filed: Dec. 29, 1999

(51) Int. Cl.[7] .......................... H04B 10/04; H04B 10/12
(52) U.S. Cl. ........................................ 398/199; 398/183
(58) Field of Search ..................... 398/182, 183, 398/185, 186, 188, 192, 195, 197, 198, 200, 32, 9, 25

(56) References Cited

U.S. PATENT DOCUMENTS

| | | | |
|---|---|---|---|
| 4,900,119 A | 2/1990 | Hill et al. | 350/96.15 |
| 5,420,868 A * | 5/1995 | Chraplyvy et al. | 398/185 |
| 5,452,116 A | 9/1995 | Kirkby et al. | 359/124 |
| 5,513,029 A * | 4/1996 | Roberts | 398/32 |
| 5,959,749 A | 9/1999 | Danagher et al. | 359/124 |
| 5,978,114 A | 11/1999 | Clark et al. | 359/115 |
| 6,094,296 A | 7/2000 | Kosaka | 359/341 |

\* cited by examiner

Primary Examiner—Leslie Pascal
Assistant Examiner—Agustin Bello

(57) ABSTRACT

A method and apparatus for encoding optical power and non-payload data in an optical signal is described. The apparatus involves a waveform generator for producing an amplitude adjusted waveform having an amplitude responsive to the optical power of the optical signal and a binary phase shift keying modulator for binary phase shift keying the amplitude adjusted waveform in response to the non-payload data to produce a dither modulating signal having an amplitude indicative of the optical power in the optical signal and having a phase representing the non-payload data. There are also disclosed methods and apparatus for extracting non-payload data from an optical signal modulated with a dither modulating signal carrying the non-payload data, involving an optical to electrical signal converter for converting the optical signal into an electrical signal. A method and apparatus for measuring optical power of individual optical signals in a composite optical signal are also disclosed.

10 Claims, 4 Drawing Sheets

METHOD AND APPARATUS FOR ENCODING OPTICAL POWER AND NON-PAYLOAD DATA IN AN OPTICAL SIGNAL

FIELD OF THE INVENTION

The present invention relates to signal encoding, and more particularly to a method and apparatus for encoding and decoding optical power and non-payload data in an optical signal.

BACKGROUND OF THE INVENTION

In modern communications networks, communications traffic is often carried on optical fibers. A plurality of transmitters may be connected to a first end of a fiber through an optical multiplexer to transmit a corresponding plurality of optical payload signals thereon. Each transmitter includes a semiconductor laser whose output optical intensity is modulated between a first predefined intensity representing a logical "0" and a second predefined intensity representing a logical "1" to generate an optical payload signal. Using a method called wavelength division multiplexing (WDM), the lasers transmitting on the fiber are chosen such that each laser generates a signal having a unique optical wavelength, permitting a plurality of payload signals to be optically multiplexed onto a single optical fiber without becoming mixed. An optical demultiplexer is connected to an opposite end of the fiber to demultiplex the plurality of optical payload signals onto a corresponding plurality of optical links for receipt by a corresponding plurality of receivers.

To manage such a communications network efficiently, it is necessary to monitor power of the optical signal, to ensure that the signal will be properly propagated through the optical fiber to be detected at a receiver. One method of facilitating optical power measurement is disclosed in U.S. Pat. No. 5,513,029 to Roberts, wherein an optical payload data signal is submodulated with a dither signal encoded with a pseudo random code, and having a submodulation depth which is maintained constant relative to mean optical power of the submodulated optical payload data signal. A pseudo random code is used to broaden the emission spectrum of lasers used in optical transmitters to reduce non-linear optical effects such as Stimulated Brillouin Scattering (SBS).

In addition, to effectively manage an optical system it is desirable to transmit communications and control information between nodes on an optical network. This is typically done by including communications and control information, also referred to as overhead data, in the payload data signal or by submodulating the payload signal with overhead data.

Thus, submodulation of an optical signal has been used for either power monitoring or for transmission of communications and control data. Typically, where submodulation is used for power monitoring, communications and control data is transmitted in payload data and where submodulation is used for payload data, power monitoring is not provided.

Generally, it is not possible to simply add the communications and control data to the pseudo random codes used for power monitoring as this can result in a submodulation depth greater than an allowable limit. Exceeding such a limit may limit the distance the light can travel in the fiber, requiring more optical amplifiers at shorter spacings.

Furthermore, while channel power information is directly measurable when the channels are separate, prior to WDM multiplexing or after demultiplexing, it is difficult to directly measure the power of individual channels of a WDM signal. One existing method of determining channel power of a WDM signal involves optically demultiplexing the WDM signal to retrieve individual optical payload signals, converting the individual optical payload signals into individual electrical signals and then measuring the power of each such electrical signal. However, this method requires the use of a relatively expensive optical demultiplexer and may not, therefore, be economical.

Thus, there is a need for a way to transmit power information and non-payload data in an optical signal without excessive depth of modulation and without interfering with the payload data, while facilitating economical power measurement.

SUMMARY OF THE INVENTION

The present invention addresses the above need by providing a method and apparatus for encoding optical power and non-payload data in an optical signal, which involve producing a dither modulating signal having an amplitude indicative of the optical power in the optical signal and having a phase representing non-payload data, and modulating the optical signal with the dither modulating signal.

Such a system facilitates the use of a constant depth of modulation of the optical signal while enabling both optical power and non-payload information to be transmitted, independently of the payload data encoded in the optical signal. Thus, the optical signal need not be demodulated to enable the payload data to be combined with non-payload data, thereby reducing the expense of the optical system.

In one embodiment, a depth of modulation is produced in the optical signal in response to the amplitude of the dither modulating signal and the amplitude of the dither modulating signal may be varied in response to the optical power of the optical signal, to maintain a constant depth of modulation.

The optical mean power of the optical signal may be measured and a representation of a measured depth of modulation of the optical signal may be produced by squaring a representation of the optical signal to produce a tone signal having a tone signal amplitude representing the measured depth of modulation. A digital representation of the tone signal amplitude and a digital representation of the optical mean power may be used by a processor to compute a ratio of modulation depth to mean optical power, and this ratio may be used for controlling a waveform generator to adjust the amplitude of a reference waveform to produce an amplitude adjusted waveform. This amplitude adjusted waveform may be binary phase shift keyed (BPSK) by the non-payload data to produce the dither modulating signal. The light output of a laser may be controlled in response to the dither modulating signal to modulate the optical signal. Thus, instead of encoding the dither signal with a pseudo random code as in the prior art, the dither signal is phase-encoded by non-payload data. The amplitude of the dither signal encodes optical power information while the phase of the dither signal encodes non-payload data. Power and non-payload data are thus encoded in the same dither signal.

In accordance with another aspect of the invention, there is provided an optical signal produced by the method described above.

In accordance with another aspect of the invention, there is provided an apparatus for encoding optical power and non-payload data in an optical signal. The apparatus includes provisions for producing a dither modulating signal having an amplitude indicative of the optical power in the optical signal and having a phase representing the non-payload data and provisions for modulating the optical signal with the dither modulating signal.

In accordance with another aspect of the invention, there is provided an apparatus for encoding optical power and non-payload data in an optical signal. The apparatus includes a waveform generator for producing an amplitude adjusted waveform having an amplitude responsive to the optical power of the optical signal and further includes a binary phase shift keying modulator for binary phase shift keying the amplitude adjusted waveform in response to the non-payload data to produce a dither modulating signal having an amplitude indicative of the optical power in the optical signal and having a phase representing the non-payload data.

Preferably, the waveform generator includes a tone generator for generating a tone signal representing a depth of modulation in the optical signal due to amplitude of the dither modulating signal. The waveform generator may include an optical power signal generator for generating an optical power signal representative of optical mean power of the optical signal.

The apparatus may further include a reference waveform generator for generating a reference waveform of constant amplitude and may include a gain controlled amplifier for amplifying the reference waveform to produce the amplitude adjusted waveform. The gain controlled amplifier may be controlled by a processor circuit which produces a gain control value for controlling the gain controlled amplifier in response to the optical mean power and depth of modulation of the dither modulating signal.

Preferably, the processor circuit is programmed to adjust the gain control value such that the dither modulating signal has a constant modulation depth in the optical signal. The processor circuit is also preferably programmed to compute a ratio of the modulation depth to optical mean power and to adjust the gain control value to maintain the ratio of modulation depth to optical mean power constant.

The apparatus may further include a laser having a bias current control for receiving the dither modulating signal to modulate an optical signal produced by the laser in response to the dither modulating signal. In accordance with another aspect of the invention, there is provided a method of extracting non-payload data from an optical signal modulated with a dither modulating signal carrying the non-payload data by producing an electrical representation of the optical signal, demodulating the electrical representation to extract a binary phase shift keyed signal, and demodulating the binary phase shift keyed signal to obtain the non-payload data.

The method may further include squaring the binary phase shift keyed signal to produce a tone signal having an amplitude representative of the power of the optical signal. The value representing the amplitude of the tone signal may be multiplied by a predefined value to determine the power of the optical signal.

In accordance with a further aspect of the invention, there is provided an apparatus for extracting non-payload data from an optical signal modulated with a dither modulating signal carrying the non-payload data. The apparatus may include an optical to electrical signal converter for converting the optical signal into an electrical signal, a first demodulator for demodulating the electrical signal to extract a binary phase shift keyed (BPSK) signal from the, electrical signal and a BPSK demodulator for demodulating the binary phase shift keyed signal to obtain the non-payload data.

In accordance with another aspect of the invention, there is provided a method and apparatus for measuring optical power in individual optical signals of a composite optical signal. An optical to electrical signal converter converts the composite optical signal into a composite electrical signal, a demodulator demodulates the composite electrical signal to produce a composite dither signal comprised of a plurality of dither modulating signals and a squarer squares the individual dither modulating signals to produce a composite squared signal including a plurality of tone signals representing optical power in respective individual optical signals.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
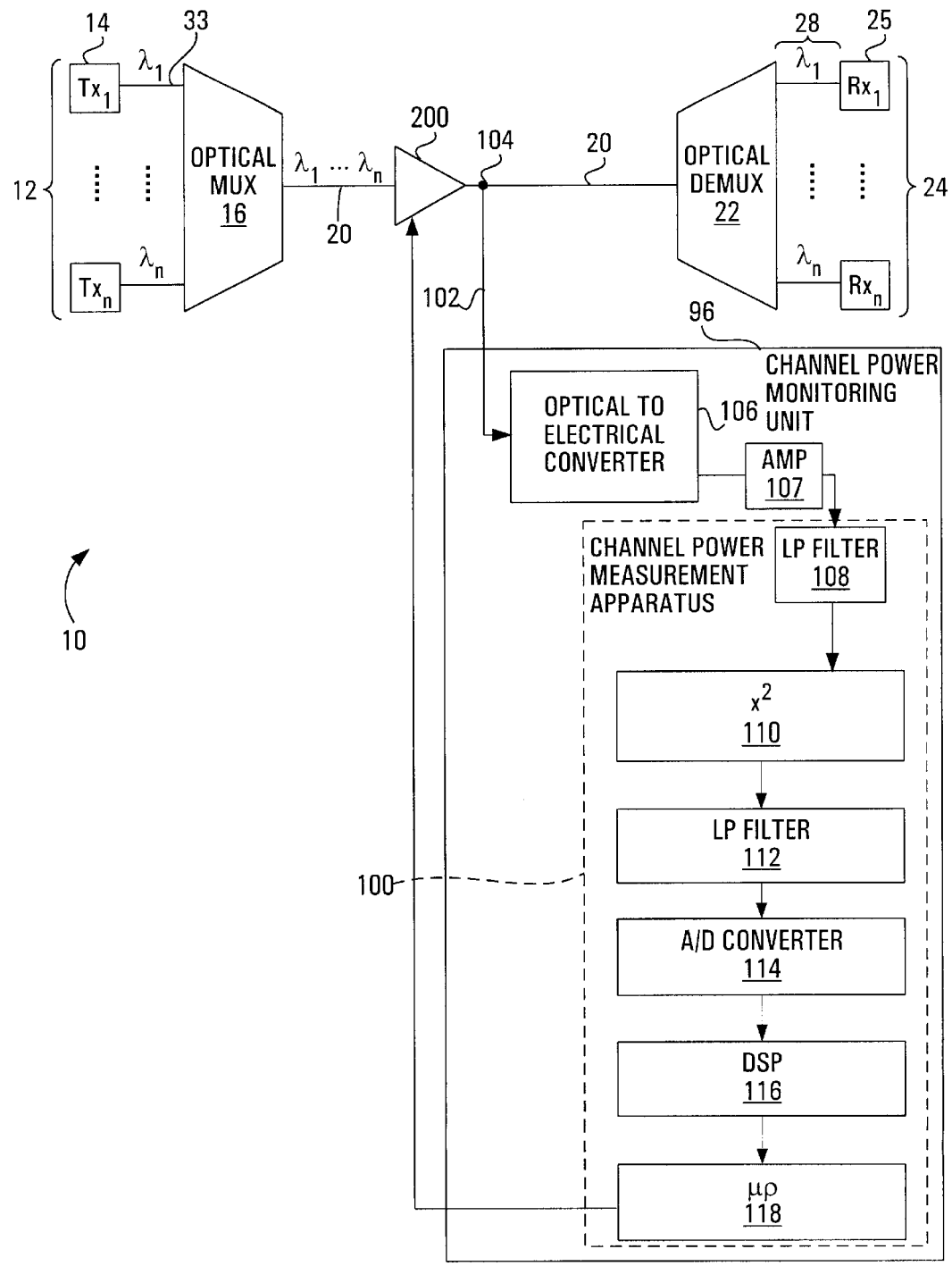
FIG. 1 is a block diagram of a wavelength division multiplexed network according to one embodiment of the invention.

As shown in FIG. 1, a wavelength division multiplexed (WDM) network is shown generally at 10. The network 10 includes a plurality of transmitting stations, or optical transmitters 12 connected to an optical medium 20 by an optical multiplexer 16. The optical medium 20 is connected to an optical demultiplexer 22 which is further connected to a plurality of optical receivers 24. An optical amplifier such as that shown at 200 or a plurality such optical amplifiers maybe positioned at locations along the optical medium to amplify optical signals on the optical medium 20 to compensate for optical attenuation on the medium 20. Effectively, the network functions to permit optical signals produced by the optical transmitters 12 to be received at respective optical receivers 24.

Figure 2:
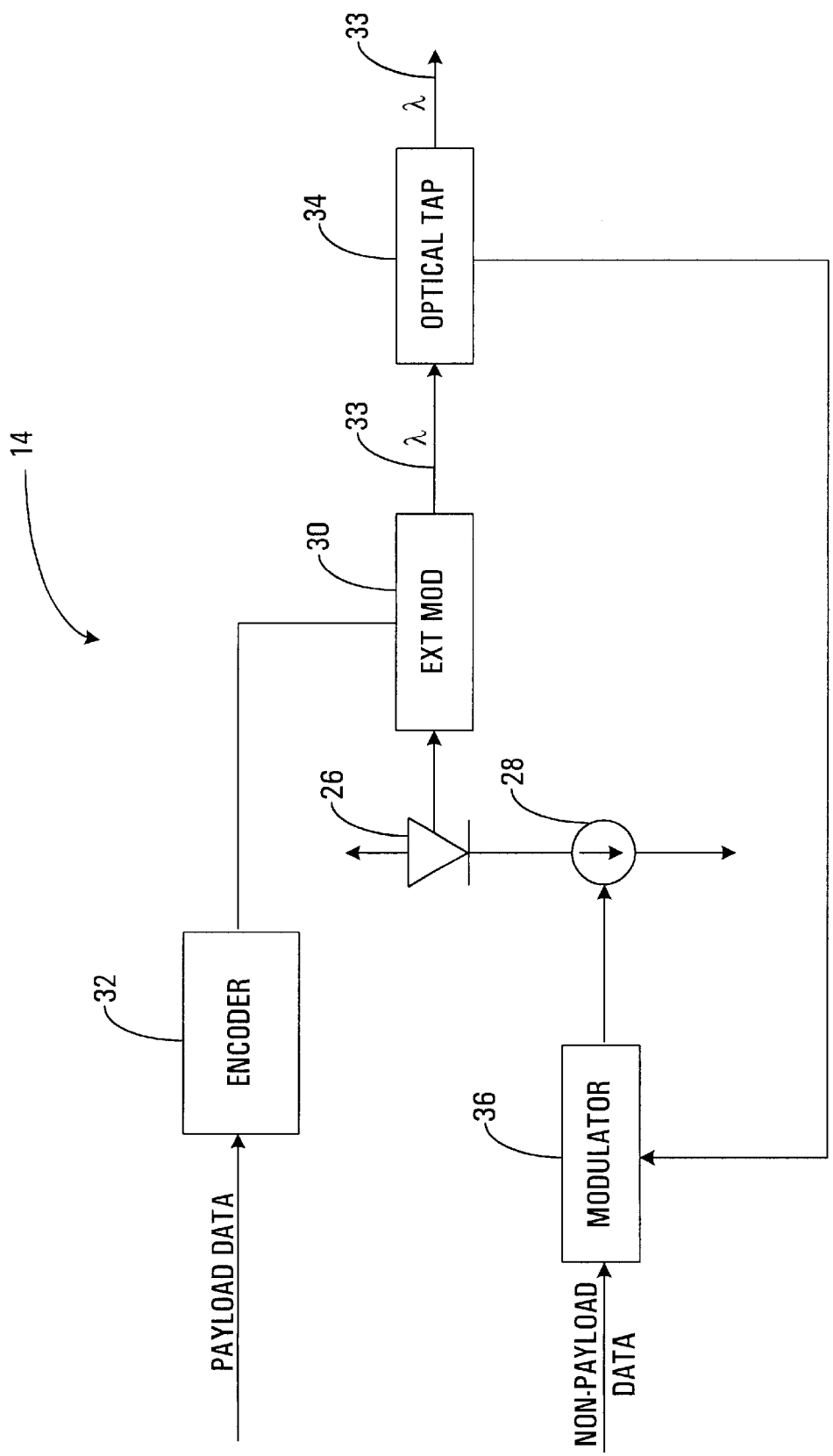
FIG. 2 is a block diagram of a first transmitter shown in FIG. 1.

Referring to FIG. 2, a first transmitter is shown generally at 14. The first transmitter 14 is representative of each of the optical transmitters 12 shown in FIG. 1.

The first transmitter 14 includes an optical source 26 which in this embodiment includes a semiconductor laser. The optical source 26 is controlled by a bias current controller 28 for adjusting the intensity of light produced by the optical source 26. Such light is provided to an external modulator 30 which receives a payload data modulating signal from an encoder 32 which receives a conventional high frequency payload data signal. This signal may provide data to the encoder at a rate of approximately 2.5 Gigabits per second, for example. Such data may originate at a telecommunications switch or router, for example, and may be provided to the encoder 32 by a trunk line, for example. Alternatively, the optical source 26 may be modulated directly by the payload data modulating signal.

In this embodiment, the payload data modulating signal produced by the encoder 32 directs the external modulator 30 to modulate the light produced by the optical source 26 to produce a high frequency optical signal which is provided by the external modulator 30 to an optical medium 33 and to an optical tap 34. The optical medium 33 is in communication with the optical multiplexer 16 shown in FIG. 1 to provide an optical signal thereto at a wavelength A, for multiplexing onto the optical medium 20.

Referring back to FIG. 2, the optical tap 34 taps off or couples approximately 3% of the optical signal on the optical medium 33 to produce an optical tap signal which is provided to a non payload data modulator 36. The non payload data modulator 36 receives a digital bit stream of non payload data at a much lower frequency than the payload data provided to the encoder 32. Such a digital bit stream may originate at a control or distributed control system for controlling devices in the optical system or for providing for communication between devices in the optical system, for example. This type of digital bit stream may have a frequency of several hundred kilobits per second, for example.

The non payload data modulator 36 acts as an apparatus for encoding optical power and non-payload data in an optical signal. In general, the non-payload data modulator produces a dither modulating signal having an amplitude indicative of power in the optical signal produced on the optical medium 33 and having a phase representing the non payload data. The dither modulating signal is used to control the bias controller 28 to modulate the optical signal produced by the optical source 26 before it is modulated by the external modulator 30. Alternatively, the dither modulating signal may be used to control the external controller to sum the dither modulating signal with the payload data modulating signal produced by the encoder 32.

Figure 3:
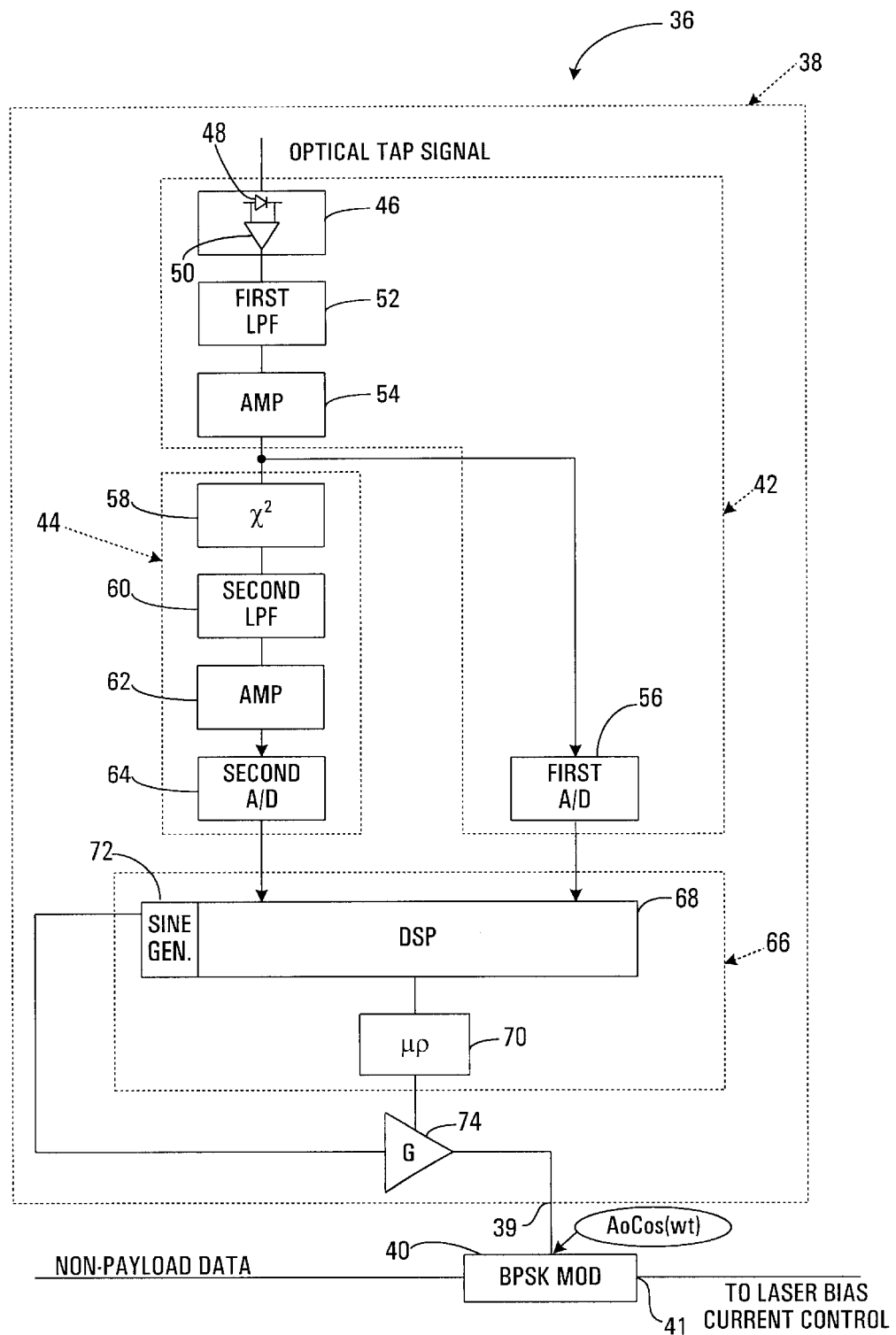
FIG. 3 is a block diagram of a non-payload data modulator of the first transmitter shown in FIG. 2.

Referring to FIG. 3, the non payload data modulator 36 is illustrated and includes a waveform generator 38 for producing at an output 39 thereof an amplitude adjusted waveform having an amplitude $A_0$ responsive to power of the optical signal. The non payload data modulator further includes a binary phase shift keying (BPSK) modulator 40 for binary phase shift keying the amplitude adjusted waveform in response to the non payload data to produce the dither modulating signal, at an output 41 thereof such that the dither modulating signal has an amplitude indicative of power in the optical signal and a phase representing the non payload data. Effectively, the dither modulating signal has the form:

g(t)=$A_0$cos($\omega_1$t+$\phi$), while the non-payload data has the binary value "1"; and g(t)=−$A_0$cos($\omega_1$t+$\phi$), while the non-payload data has the binary value "0".

where $A_0$ is the amplitude of the amplitude adjusted waveform and $\omega$ is the frequency of a reference waveform.

To produce the value $A_0$, the waveform generator 38 includes a optical power signal generator 42 for generating an optical power signal representative of optical mean power of the optical signal and includes a tone generator 44 for generating a tone signal representing a current depth of modulation in the optical signal due to the dither modulation signal.

The optical power signal generator 42 includes an optical to electrical converter 46, which in this embodiment includes a PIN diode which converts the tapped optical signal to a photocurrent. The optical to electrical converter 46 may further include a transimpedance amplifier 50 which amplifies and converts the photocurrent to a voltage. The voltage produced by the transimpedance amplifier 50 is provided to a first low pass filter 52 and then amplified by a first amplifier 54 to bring the signal produced by the low pass filter 52 up to a level compatible with an analog to digital converter 56 of the optical power signal generator 42. The analog to digital converter 56 produces a time varying digital representation of the signal produced by the first amplifier 54, the average amplitude of the digital representation being representative of optical mean power of the optical signal tapped off from the optical medium 33 shown in FIG. 2.

Still referring to FIG. 3, the tone generator 44 includes a signal squaring circuit 58 which squares the signal produced by the first amplifier 54. The squaring circuit 58 has the effect of squaring the dither modulating signal carried by the optical signal on the optical medium 33, to produce a waveform represented by the following equation:

$$g^2(t) = \frac{A_o^2}{2}(1 + \cos(2\varpi t + 2\phi))$$

Thus, a tone signal having a frequency of 2ω and an amplitude of $$\frac{A_o^2}{2}$$

is produced by the squaring operation. The signal produced by the squaring circuit 58 is provided to a second low pass filter 60 which removes any high frequency noise produced by the squaring operation. The signal produced by the second low pass filter is provided to a second amplifier 62 for scaling the signal for compatibility with a second analog to digital converter 64 which produces a time varying digital representation of the amplified tone signal.

The amplitude of the digital representation thus represents the amplitude of the tone signal. The digital representation of the optical mean power signal produced by the first analog to digital converter 56 and the digital representation of the tone signal produced by the second analog to digital converter 64 are provided to a processor circuit shown generally at 66. In this embodiment the processor circuit 66 includes a digital signal processor 68 and a microprocessor 70.

The digital signal processor 68 includes a reference waveform generator 72 for generating a reference waveform of constant amplitude. This reference waveform is provided to a gain controlled amplifier 74 for amplifying the reference waveform to produce an amplitude adjusted waveform, having an amplitude $A_0$. The digital signal processor 68 and the microprocessor 70 cooperate to produce a gain control value for controlling the gain controlled amplifier 74 in response to the optical mean power signal and the depth of modulation of the optical signal due to the dither modulating signal as represented by the tone signal.

Effectively, the processor circuit 66 produces the reference waveform and the gain control value which are supplied to the gain controlled amplifier 74, which produces the amplitude adjusted waveform having an amplitude responsive to power of the optical signal, for controlling the binary phase shift keying modulator 40.

To produce the gain control value G, the digital signal processor 68 performs a discrete fourier transform operation on the digital representation of the optical mean power signal and the digital representation of the tone signal to produce an optical mean signal power value representing optical mean power and to produce a tone signal amplitude value T, representing amplitude of the tone signal at the frequency $2\omega$. These two values are passed to the microprocessor 70 which is programmed to compute a modulation depth d from the tone signal amplitude value T, according to the formula:

$$d=\sqrt{\sqrt{2T}}$$

In order to produce the gain control value G, preferably, the processor circuit 66 is programmed to compute a ratio of the modulation depth d, to optical mean power p and to adjust the gain control value G to maintain this ratio constant.

In particular, in this embodiment, the gain control factor is produced by first calculating an error value, e, according to the following relation:

$$e = \frac{\alpha d}{p} - r$$

where $\alpha$=constant scale factor
d=modulation depth of modulating dither signal
p=optical mean power value
r=desired ratio of modulation depth to optical mean power
e=error value The constant scale factor $\alpha$ is determined empirically by measurements of optical calibration signals and is influenced by attenuation and gain and by optical to electrical transfer functions of the optical to electrical converter 46, the first low pass filter 52, the first amplifier 54, the squaring circuit 58, the second low pass filter 60, the amplifier 62 and the second analog to digital converter 64. The desired ratio r is a constant identifying the percentage of the modulation to be applied to the optical signal to represent the modulating dither signal and in this embodiment the ratio r=0.1 represents 10% modulation.

After determining the error value e, the gain control value G is calculated according to the following relation:

$$G = G_0(1-e)$$

where $G_0$ is an initial gain scaling factor, e is the error value calculated in the equation above and G is the gain value to be applied to the amplifier 74 shown in FIG. 3.

From the foregoing, it will be appreciated that as the entity $$\alpha \frac{d}{p}$$

tends to the desired modulation ratio r, the error e becomes zero, in which case the gain presented to the amplifier is simply $G_0$. As the entity $$\alpha \frac{d}{p}$$

increases, the error increases and the gain G decreases, thereby decreasing the amplitude $A_0$ of the dither modulating signal to the BPSK modulator 40 shown in FIG. 3. Conversely, as the entity $$\alpha \frac{d}{p}$$

decreases, the error value e tends towards $-r$ and the gain value G tends towards $G_0(1+r)$, which in this embodiment is $-1.1 G_0$. The amplitude adjusted waveform produced by the waveform generator 38 is thus dependent upon the entity $$\alpha \frac{d}{p}$$

which is defined by the non payload data signal and the optical mean power signal. Hence, the amplitude adjusted waveform has an amplitude responsive to power of the optical signal and this waveform is used to control the amplitude of the dither modulating signal while the non-payload data is used to control the phase of the dither modulating signal produced at the output 41 of the BPSK modulator 40.

Referring back to FIG. 1, each transmitter is configured produce to a similar dither modulating signal but at a different frequency $\omega$ from each other transmitter. Therefore, each of the transmitters 12 generates a respective dither modulating signal, having a respective unique carrier frequency $\omega$ each of which is orthogonal to each other to permit detection and separation.

The optical signal produced on the optical medium 33 is effectively a composite optical signal as it is comprised of the payload signal and the dither modulating signal, hence it may be referred to as a composite optical signal. Since each transmitter produces a separate composite optical signal on its own "channel" or different wavelength of light, the composite optical signals produced by the transmitters are henceforth referred to as channel composite optical signals.

The channel composite optical signal from the first transmitter 14 is supplied to a corresponding input of the optical multiplexer 16 for Wavelength Division Multiplexing (WDM) with other channel composite optical signals produced by respective other optical transmitters. Thus, the optical multiplexer produces a WDM composite optical signal comprising the channel composite optical signals from each optical transmitter, on the optical medium 20.

The optical demultiplexer 22 receives the WDM composite optical signal and splits it into respective channel composite optical signals. Each channel composite optical signal is supplied to a respective optical receiver 24.

Figure 4:
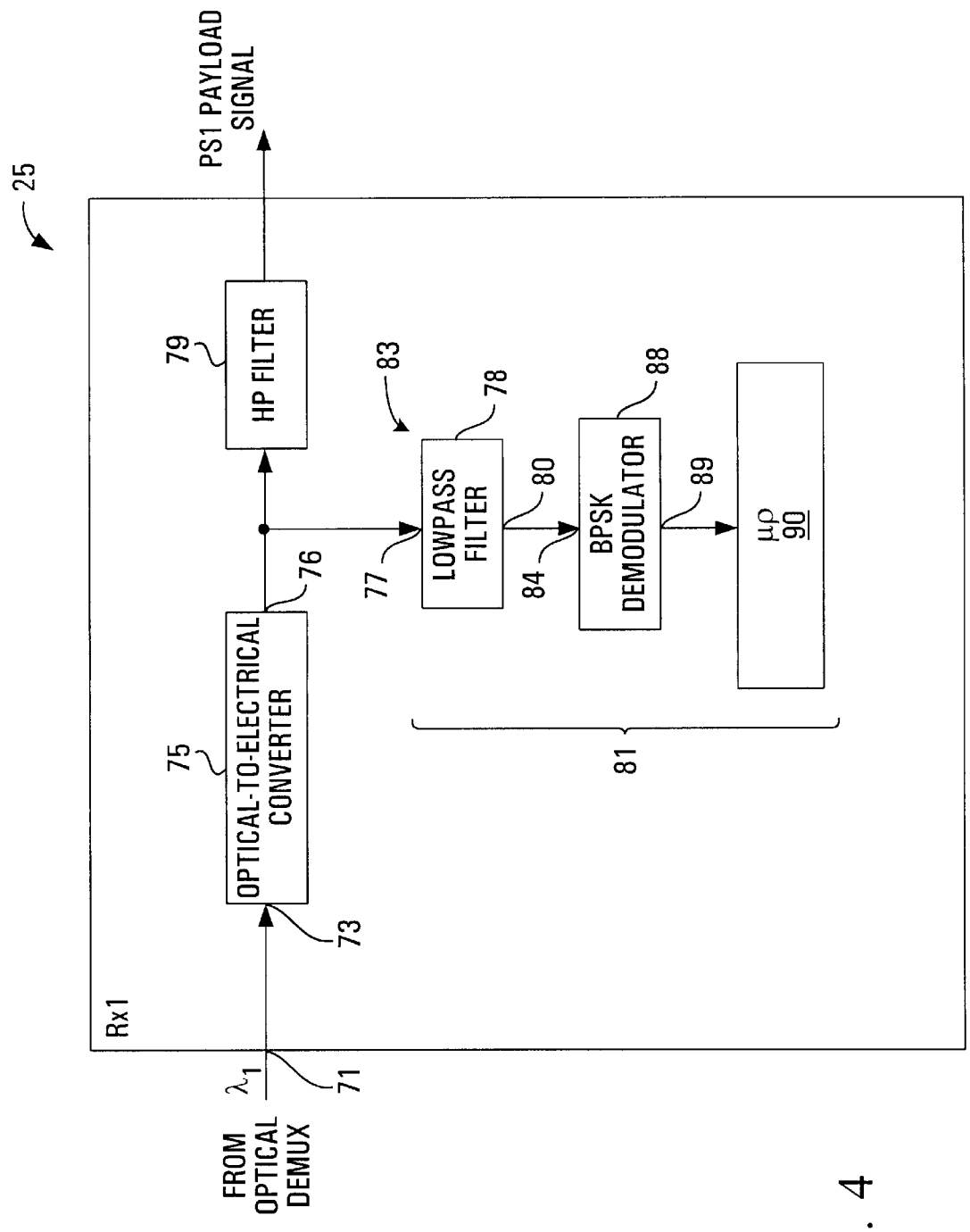
FIG. 4 is a block diagram of a first receiver shown in FIG. 1.

Referring to FIG. 4, a first optical receiver is shown generally at 25. The first receiver 25 is representative of each of the receivers 24 shown in FIG. 1. The first receiver acts to extract payload data from the received channel composite optical signal and includes an apparatus 81 for extracting non-payload data from the channel composite signal carrying payload data, after conversion from optical form to electrical form. To do this, the first optical receiver 25 includes an input terminal 71 for receiving a channel composite optical signal. The input terminal 71 is connected to an input 73 of an optical-to-electrical (O-E) converter 75, such as a PIN diode and transimpedance amplifier as described above, for example, to provide the channel composite optical signal thereto. The O-E converter 75 is configured to produce a channel composite electrical signal at an output 76, the channel composite electrical signal being proportional to the channel composite optical signal appearing at the input 73. The channel composite electrical signal is supplied to a highpass filter 79 to remove low frequency components therefrom. The output of the highpass filter 79 provides payload data from the received channel composite optical signal.

The channel composite electrical signal is also supplied to the apparatus 81 for extracting non-payload data. Effectively, the apparatus for extracting non-payload data includes a first demodulator shown generally at 83 for demodulating the channel composite electrical signal to extract a binary phase shift keyed (BPSK) signal therefrom and includes a BPSK demodulator 88 for demodulating the BPSK signal to obtain the non-payload data. The first demodulator 83 is provided by a lowpass filter 78 having an input 77 for receiving the channel composite electrical signal and having an output 80 for providing the binary phase shift keyed signal therefrom. The output 80 is connected to an input 84 of the BPSK demodulator 88. In this embodiment, the BPSK demodulator is configured to detect 180 degrees phase shifts in the BPSK signal applied to the input 84 and to produce, at an output 89, a received digital non-payload data signal wherein binary values represent phase shifts in the BPSK signal. The output 89 of the BPSK demodulator therefore provides the non-payload data and may be connected to a microprocessor 90, for example, to provide the non-payload data thereto for use in responding to control or communication information encoded in the non-payload data.

Referring back to FIG. 1, the network 10 may further include a channel power monitoring unit 96 connected to the optical medium 20 to monitor channel power of individual composite optical signals making up the WDM composite optical signal. In this embodiment, the channel power monitoring unit 96 includes an optical interface and an apparatus 100 for measuring channel power of a composite optical signal. The optical interface includes an optical tap 102 at a point 104 on the optical medium 20 between the optical multiplexer 16 and the optical demultiplexer 22, so as to tap off a portion of the WDM composite optical signal carried on the optical medium 20 to produce a tapped WDM composite optical signal. As described above, the optical tap may divert approximately 3% of the optical signal power carried by the optical medium 20 for use as an optical tap signal.

The optical tap 102 is in communication with an optical-to-electrical (O-E) converter 106, such as a PIN diode and transimpedance amplifier as described above, to produce an electrical representation of the tapped WDM composite optical signal. The optical to electrical conversion process destroys the wavelength separation between the individual channel composite optical signals in the tapped WDM composite optical signal, destroying the multiplexed nature thereof. The optical to electrical conversion process does, however, produce an electrical tapped WDM signal which is, in effect, representative of a superposition of all of the channel composite optical signals.

The output of the O-E converter 106 is connected to an amplifier 107 for amplifying the electrical tapped WDM signal for receipt by the apparatus 100 for measuring channel power. The apparatus 100 for measuring channel power includes a demodulator for demodulating the amplified electrical tapped WDM signal to remove payload components of the individual channel composite electrical signals, thereby producing a composite low frequency signal. In this embodiment, the demodulator is provided by a lowpass filter 108 which removes high frequency signals corresponding to the payload signals and passes low frequency signals in the frequency range of the dither modulating signals of respective transmitters.

The low frequency signal output by the lowpass filter 108 thus represents a superposition of the individual channel dither modulating signals produced at each transmitter respectively.

The apparatus 100 for measuring channel power further includes a squarer 110 for simultaneously and individually squaring each of the individual dither modulating signals to produce respective tone signals which together comprise a composite tone signal.

Each tone signal has the form:

$$T_n(t) = \left(\frac{A_n^2}{2}\right)(1 + \cos(2\omega_n t + 2\phi)) \qquad (3)$$

where $A_n$ is the amplitude of the $n^{th}$ individual channel dither modulating signal and $\omega_n$ is the frequency of the channel non-payload signal produced by the $n^{th}$ transmitter.

Thus each squared representation of a respective channel dither modulating signal is represented by a respective tone signal having a frequency at twice its original carrier frequency. As each of the channel dither modulating signals making up the composite channel non-payload signal is a BPSK encoded signal, the squarer 110 has the effect of simultaneously removing any BPSK induced phase shifts from the channel dither modulating signals.

The composite tone signal from the squarer 110 is applied to a second lowpass filter 112 which removes high frequency noise created by the squaring operation to produce a filtered composite tone signal. A digital representation of this signal is then produced by an A/D converter 114. The digital representation is processed by a digital signal processor 116 using a fast Fourier transform, for example, to determine the amplitudes of respective tone signals.

The digital signal processor 116 outputs digital values representing the amplitudes $T_1$ to $T_n$ of respective tone signals to a microprocessor 118 for calculation of individual channel powers. Alternatively, the DSP itself may calculate the individual channel powers. Knowing the amplitude of any given tone signal, the amplitude of the corresponding channel dither modulating signal in the tapped WDM composite optical signal is given by:

$$A_n(\text{tapped}) = \sqrt{2T_n}$$

where $T_n$ is the amplitude of the $n^{th}$ tone signal.

The amplitude of the corresponding channel dither modulating signal in the (non-tapped) WDM composite optical signal is given by:

$$A_n = \frac{A_n \text{ (tapped)}}{\beta}$$

where $\beta$ represents a scale factor influenced by signal loses and gains due to electronic components between the optical medium 20 and the A/D converter 114. The value $\beta$ would be approximately 0.03, for example, if signal losses and gains balance to zero as this represents the tapping of 3% of the optical signal by the optical tap at point 104.

The power of the corresponding composite optical signal is given by:

$$P_{ko} = \frac{A_n}{r}$$

where r is the desired ratio of modulation depth to optical mean power used by the corresponding transmitter. Where the modulation depth is set by the transmitter to be 10%, for example, the value r is set to 0.1.

Referring to FIG. 1, channel power information can be used by the microprocessor 118 in a variety of ways. For example, if the monitoring unit 96 is configured to measure channel power at both an input and an output of the optical amplifier 200, the monitoring unit 96 can calculate an optical gain of the amplifier 200 for each channel and control the gain of the amplifier 200 by providing negative feedback so as to correct any spectral distortion caused by the amplifier 200. The monitoring unit may be an integral part of the amplifier 200 or may be a standalone unit, for example.

As well, the monitoring unit can be used for network diagnostics. For example, if the amplitude of the tone signal produced for a particular channel falls below a certain threshold, an alarm can be raised alerting maintenance personnel of a potentially faulty optical transmission line, for example. Alternatively, if the tone signal is present at the monitoring unit, but the associated payload signal is not present at the appropriate receiver, the fault probably exists between the monitoring unit and the receiver.

While specific embodiments of the invention have been described and illustrated, such embodiments should be considered illustrative of the invention only and not as limiting the invention as construed in accordance with the accompanying claims.

What is claimed is:

1. A method of encoding optical power and non-payload data in an optical signal, the method comprising:
    a) producing a dither modulating signal having an amplitude indicative of said optical power in said optical signal and having a phase representing said non-payload data; and
    b) modulating said optical signal with said dither modulating signal
    c) wherein modulating said optical signal comprises producing a depth of modulation in said optical signal, in response to said amplitude of said dither modulating signal; and
    d) wherein producing said depth of modulation comprises measuring optical mean power in said optical signal and varying said amplitude of said dither modulating signal in response to said optical mean power of said optical signal to maintain a constant depth of modulation; and
    e) wherein producing said depth of modulation comprises producing a representation of a measured depth of modulation of said optical signal; and
    f) wherein producing said representation of said measured depth of modulation comprises squaring a representation of said optical signal to produce a tone signal having a tone signal amplitude representing said measured depth of modulation.

2. The method as claimed in claim 1 further comprising producing a digital representation of said tone signal amplitude, producing a digital representation of said optical mean power and computing a ratio of modulation depth to optical mean power.

3. The method as claimed in claim 2 further comprising producing a gain control value in response to said ratio and controlling a waveform generator to adjust the amplitude of a reference waveform used in generating said dither modulating signal in response to said ratio, to produce an amplitude adjusted waveform.

4. The method as claimed in claim 3 further comprising binary phase shift keying said amplitude adjusted waveform in response to said non-payload data, to produce said dither modulating signal.

5. The method as claimed in claim 4 further comprising controlling light output of a laser in response to said dither modulating signal.

6. An optical signal produced by the method of claim 1.

7. An apparatus for encoding optical power and non-payload data in an optical signal, the apparatus comprising:
    a) a waveform generator for producing an amplitude adjusted waveform having an amplitude responsive to said optical power of said optical signal; and
    b) a binary phase shift keying modulator for binary phase shift keying said amplitude adjusted waveform in response to said non-payload data to produce a dither modulating signal having an amplitude indicative of said optical power in said optical signal and having a phase representing said non-payload data; and
    c) wherein said waveform generator comprises a tone generator for generating a tone signal representing a depth of modulation signal; and
    d) wherein said waveform generator comprises an optical power signal generator for generating an optical power signal representative of optical mean power of said optical signal; and
    e) wherein said waveform generator comprises a reference waveform generator for generating a reference waveform of constant amplitude; and
    f) wherein said waveform generator comprises a pain controlled amplifier for amplifying said reference waveform to produce said amplitude adjusted waveform; and
    g) a processor circuit for producing a pain control value for controlling said gain controlled amplifier in response to said optical mean power and depth of modulation of said dither modulating signal.

8. The apparatus as claimed in claim 7 wherein said processor circuit is programmed to adjust said gain control value such that said dither modulating signal has a constant modulation depth in said optical signal.

9. The apparatus as claimed in claim 8 wherein said processor circuit is programmed to compute a ratio of said modulation depth to optical mean power and to adjust said gain control value to maintain said ratio of modulation depth to optical mean power constant.

10. The apparatus as claimed in claim 9, further comprising a laser having a bias current control for receiving said dither modulating signal to modulate an optical signal produced by said laser in response to said dither modulating signal.

* * * * *

UNITED STATES PATENT AND TRADEMARK OFFICE
CERTIFICATE OF CORRECTION

PATENT NO. : 6,819,879 B1
DATED : November 16, 2004
INVENTOR(S) : Ping Wai Wan

It is certified that error appears in the above-identified patent and that said Letters Patent is hereby corrected as shown below:

Column 12,
Line 24, between "modulation" and "signal" insert -- in said optical signal due to amplitude of said dither modulating --.
Lines 33 and 37, delete "pain" and substitute -- gain -- therefor.

Signed and Sealed this

Fifth Day of July, 2005

JON W. DUDAS
*Director of the United States Patent and Trademark Office*